US011303869B2

(12) United States Patent
Tajima

(10) Patent No.: US 11,303,869 B2
(45) Date of Patent: Apr. 12, 2022

(54) IMAGE PROCESSING APPARATUS AND IMAGE PROCESSING METHOD

(71) Applicant: CANON KABUSHIKI KAISHA, Tokyo (JP)

(72) Inventor: Kaori Tajima, Tokyo (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 16/696,892

(22) Filed: Nov. 26, 2019

(65) Prior Publication Data
US 2020/0177858 A1 Jun. 4, 2020

(30) Foreign Application Priority Data
Dec. 3, 2018 (JP) .............. JP2018-226426

(51) Int. Cl.
H04N 9/73 (2006.01)
H04N 1/60 (2006.01)
H04N 9/04 (2006.01)

(52) U.S. Cl.
CPC ........... H04N 9/735 (2013.01); H04N 1/6027 (2013.01); H04N 9/04515 (2018.08); H04N 2209/046 (2013.01)

(58) Field of Classification Search
CPC .. H04N 9/735; H04N 9/04515; H04N 1/6027; H04N 2209/046
See application file for complete search history.

(56) References Cited

U.S. PATENT DOCUMENTS

2014/0168466 A1* 6/2014 Yoshida ............... H04N 5/2354
348/224.1
2016/0155213 A1* 6/2016 Matsui ................. G06T 3/4007
382/260

FOREIGN PATENT DOCUMENTS

JP 2016-103797 A 6/2016

* cited by examiner

Primary Examiner — Jason A Flohre
Assistant Examiner — Fayez A Bhuiyan
(74) Attorney, Agent, or Firm — Canon U.S.A., Inc. IP Division

(57) ABSTRACT

An image processing apparatus has: a WB processing circuit that performs a plurality of kinds of WB processing for an input image that is undeveloped and captured by an image capturing element in which pixels of a plurality of colors are arranged in a mosaic pattern under a predetermined rule; filter circuits that perform color interpolation processing by referring to the input image and a signal subjected to WB processing and generate images of respective color signals whose color ratio is equivalent to that of the input image; and resizing circuits that resize the generated images.

11 Claims, 5 Drawing Sheets

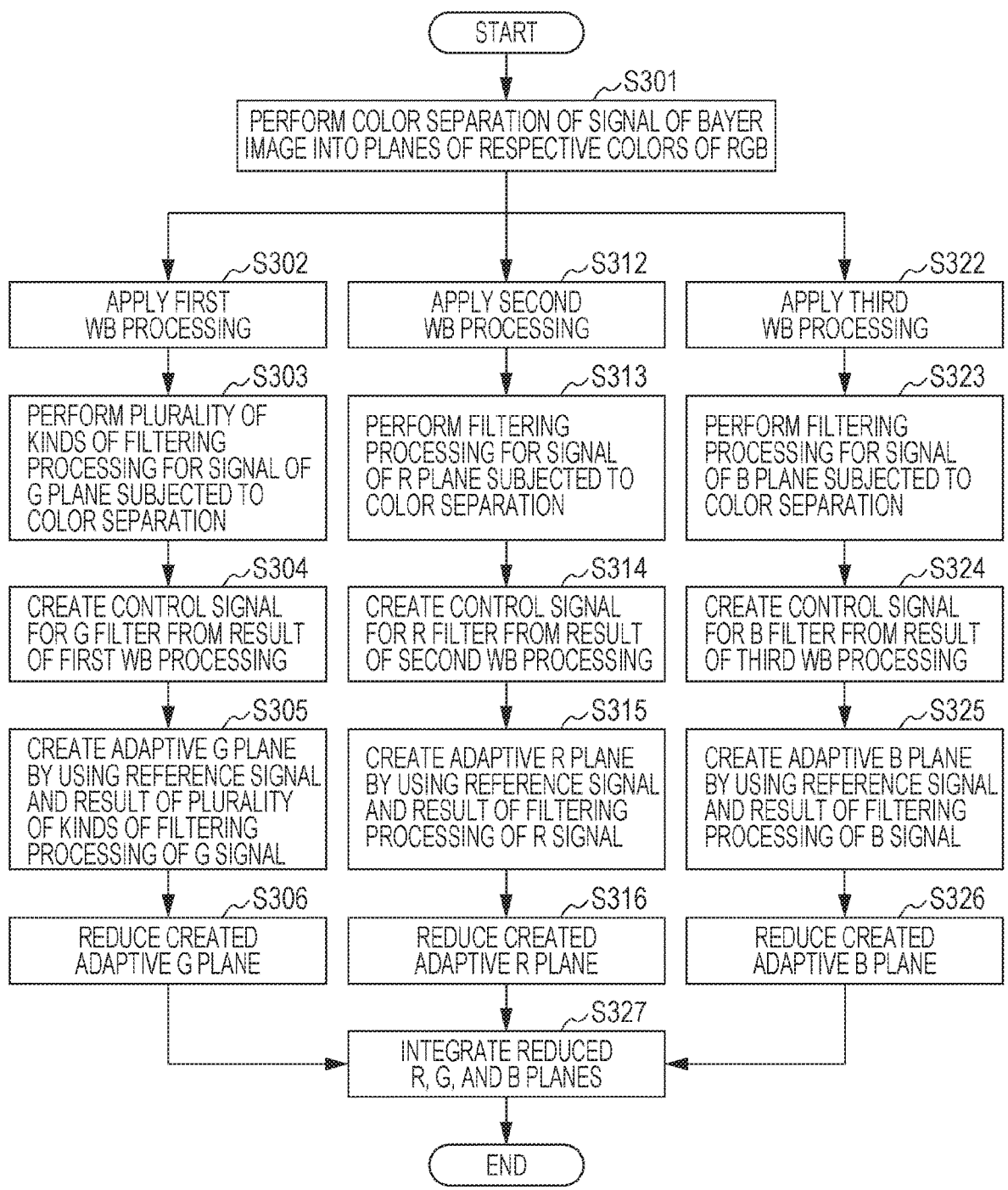

FIG. 4A

| R | G1 | R | G | R | G |
|---|----|---|---|---|---|
| G | B | G2 | B | G | B |
| R | G1 | R | G | R | G |
| G | B | G2 | B | G | B |
| R | G1 | R | G | R | G |
| G2 | B | G2 | B | G | B |

FIG. 4B

| 0 | G1 | 0 | G1 | 0 | G1 |
|---|----|---|----|---|----|
| G2 | 0 | G2 | 0 | G2 | 0 |
| 0 | G1 | 0 | G1 | 0 | G1 |
| G2 | 0 | G2 | 0 | G2 | 0 |
| 0 | G1 | 0 | G1 | 0 | G1 |
| G2 | 0 | G2 | 0 | G2 | 0 |

FIG. 4C

| R | 0 | R | 0 | R | 0 |
|---|---|---|---|---|---|
| 0 | 0 | 0 | 0 | 0 | 0 |
| R | 0 | R | 0 | R | 0 |
| 0 | 0 | 0 | 0 | 0 | 0 |
| R | 0 | R | 0 | R | 0 |
| 0 | 0 | 0 | 0 | 0 | 0 |

FIG. 4D

| 0 | 0 | 0 | 0 | 0 | 0 |
|---|---|---|---|---|---|
| 0 | B | 0 | B | 0 | B |
| 0 | 0 | 0 | 0 | 0 | 0 |
| 0 | B | 0 | B | 0 | B |
| 0 | 0 | 0 | 0 | 0 | 0 |
| 0 | B | 0 | B | 0 | B |

IMAGE PROCESSING APPARATUS AND IMAGE PROCESSING METHOD

BACKGROUND

Field of the Disclosure

The present disclosure relates to an image processing technique of processing an image that is captured.

Description of the Related Art

An application program for a personal computer or a redevelopment function in a camera has been known as the related art that an image quality parameter of an undeveloped image is adjusted by a user and a development processing result based on the image quality parameter is displayed in real time. In such intended use in which the development processing result is displayed in real time, in order to increase a speed and to reduce power consumption, it is desirable to perform development processing after resizing (specifically, reducing) the undeveloped image in previous processing as much as possible. On the other hand, an image capturing element of a general camera has color filters of R (red), G (green), and B (blue) regularly arranged in a mosaic pattern, and a signal of an undeveloped image that is output from each of pixels of the image capturing element only includes any of color signals of R, G, and B signals. Thus, in a case where development is performed after reducing the undeveloped image, synchronized interpolation of RGB color signals and band limitation according to a reduction ratio need to be performed before the reduction. When such processing is performed, for example, by simple linear interpolation, lowering of image quality, such as lowering of perceived resolution or generation of aliasing, is caused because of a difference in a sampling structure between colors in the image capturing element. On the other hand, Japanese Patent Laid-Open No. 2016-103797 discloses a technique in which, when an undeveloped image is reduced, a correlation of pixels proximate to a target pixel is detected in accordance with a reduction ratio and adaptive interpolation according to the correlation is performed to thereby suppress deterioration in image quality.

In the technique described in Japanese Patent Laid-Open No. 2016-103797, however, a signal level difference caused by color filters arranged in respective pixels is cancelled and the correlation of the pixels proximate to the target pixel is detected, so that white balance adjustment needs to be performed in advance for an input image. Thus, in a case where a signal value after the white balance adjustment is clipped due to circuit saturation, when a user adjusts an image quality parameter later, image quality is deteriorated due to clipping or a degree of freedom in the adjustment is decreased.

SUMMARY

An image processing apparatus according to embodiments of the disclosure includes: at least one memory device; at least one processor; a processing unit configured to perform a plurality of kinds of white balance processing for an input image that is undeveloped and captured by an image capturing element in which pixels of a plurality of colors are arranged in a mosaic pattern under a predetermined rule; a generation unit configured to perform color interpolation processing by referring to the input image and a signal subjected to white balance processing by the processing unit and to generate an image of each of color signals whose color ratio is equivalent to that of the input image; and a resizing unit configured to resize the image generated by the generation unit, in which the processing unit, the generation unit, and the resizing unit are realized by the at least one processor performing a program stored in the at least one memory device.

Further features of the present disclosure will become apparent from the following description of exemplary embodiments with reference to the attached drawings.

BRIEF DESCRIPTION OF THE DRAWINGS

FIG. 3 is a flowchart illustrating a flow of processing of the image resizing circuit.

FIGS. 4A, 4B, 4C, and 4D are schematic views each illustrating pixel arrangement of an image capturing element having Bayer array.

DESCRIPTION OF THE EMBODIMENTS

Embodiments of the disclosure will be specifically described below with reference to the accompanying drawings.

Figure 1:
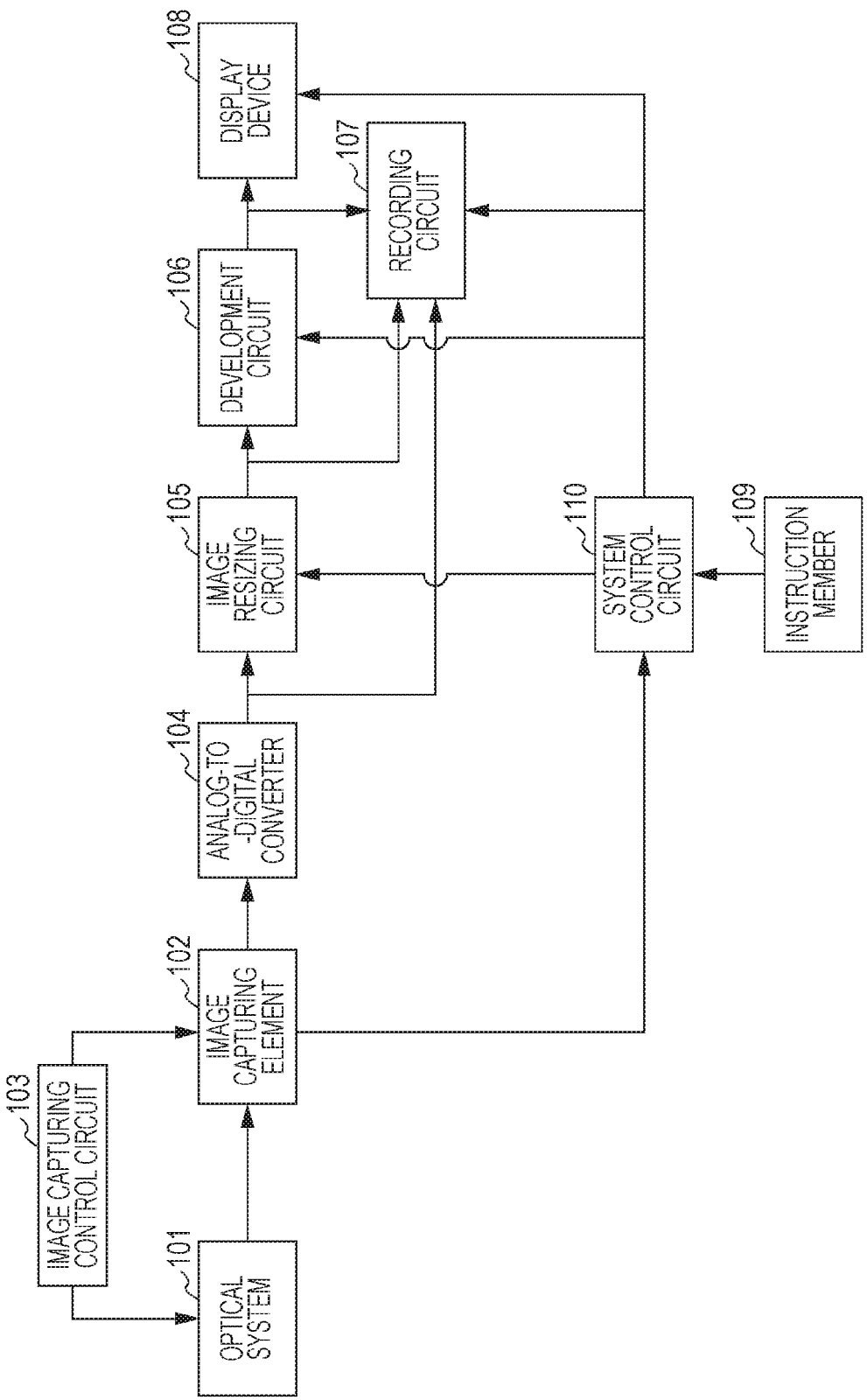
FIG. 1 is a block diagram illustrating an example of a configuration of an image processing apparatus in an embodiment.

FIG. 1 is a block diagram illustrating an example of a schematic configuration of an image processing apparatus according to an embodiment. As an application example of the image processing apparatus in the present embodiment, an image capturing apparatus (digital camera) will be described, but image processing according to the present embodiment may be achieved by an application program for a personal computer (PC) (PC application).

The digital camera illustrated in FIG. 1 is configured by including an optical system 101, an image capturing element 102, an image capturing control circuit 103, an analog-to-digital converter 104, an image resizing circuit 105, a development circuit 106, a recording circuit 107, a display device 108, an instruction member 109, and a system control circuit 110. The optical system 101 includes a focus lens, a diaphragm, and a shutter. The image capturing element 102 is an element, such as a CMOS or a CCD, which performs conversion according to a light amount of a subject formed in the optical system 101 into an electric signal by using photoelectric conversion. It is assumed that the image capturing element 102 of the present embodiment is an image capturing element having so-called primary color Bayer array in which color filters of a plurality of colors such as R (red), G1 (green), G2 (green), and B (blue) are arranged in a mosaic pattern under a predetermined rule. Note that, the image capturing element 102 may be a single-plane image capturing element having a mosaic pattern other than the Bayer array. The image capturing control circuit 103 controls the focus, the diaphragm, and the shutter of the optical system 101, and an image capturing operation, image capturing sensitivity, and the like of the image capturing element 102. The analog-to-digital converter 104 generates image data obtained by converting the electric signal output from the image capturing element 102 into a digital signal. The image data output from the analog-to-digital converter 104 is undeveloped image data. Hereinafter, the undeveloped image data is referred to as a raw image.

The image resizing circuit 105 performs resizing processing and image conversion processing for recording for the raw image. Though details will be described later, the image resizing circuit 105 performs resizing processing of reducing the raw image and generates a raw image (hereinafter, referred to as a reduced raw image) having low resolution.

The development circuit 106 performs so-called development processing, such as tone conversion processing, luminance/color difference generation processing, or sharpness processing, for the reduced raw image output from the image resizing circuit 105. The recording circuit 107 records the raw image output from the analog-to-digital converter 104, the reduced raw image output from the image resizing circuit 105, and a developed image output from the development circuit 106. Here, the raw image acquired through image capturing by the image capturing element 102, the reduced raw image generated from the raw image by the resizing processing, and the developed image obtained by developing the reduced raw image are recorded in the recording circuit 107 in association with the same file. Thus, in a case where development is performed after a user optionally adjusts an image quality parameter of the raw image, which is included in the recorded file, by a PC application (not illustrated) or the like, it is possible to perform high-speed development processing for the reduced raw image and to check a result thereof immediately.

The display device 108 is, for example, a liquid crystal display or the like provided on a back surface of a camera and displays an image based on an image signal output from the development circuit 106, a graphical user interface image, or the like. The instruction member 109 is an operation dial set to a main body of the camera, a liquid crystal display of a touch panel type on the back surface of the camera, or the like. By operating the instruction member 109, the user is able to input a setting value or the like for adjustment of a white balance or adjustment of a development parameter, for example. The system control circuit 110 controls an entire operation of the camera, or the like.

Figure 2:
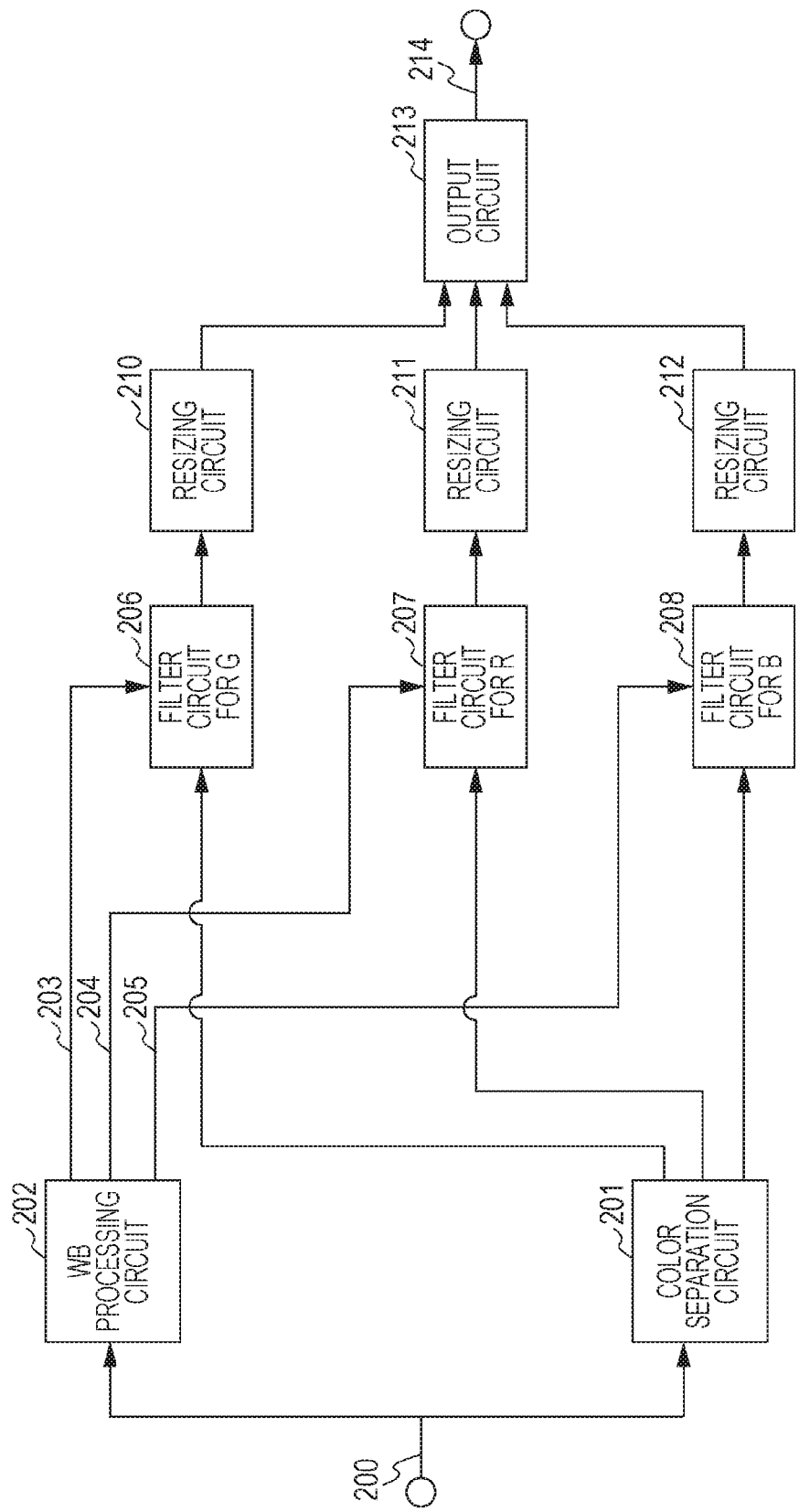
FIG. 2 is a block diagram illustrating an example of a configuration of an image resizing circuit.

FIG. 2 is a block diagram illustrating an example of a configuration of the image resizing circuit 105. The configuration of the image resizing circuit 105 will be described below with reference to FIG. 2.

An input image 200 of the image resizing circuit 105 is the raw image output from the analog-to-digital converter 104. That is, the input image 200 is a so-called Bayer image not subjected to white balance processing (hereinafter, referred to as WB processing). The input image 200 is input to each of a color separation circuit 201 and a WB processing circuit 202.

The color separation circuit 201 separates the input image 200 before white balance processing, that is, the Bayer image not subjected to WB processing for respective colors of R, G, and B. Further, the color separation circuit 201 generates images (hereinafter, referred to as an R plane, a G plane, and a B plane) in which color signals of R, G, and B (hereinafter, referred to as an R signal, a G signal, and a B signal) that are separated are arranged so as to correspond to pixel positions. The R plane is an image in which the R signal of the Bayer image not subjected to WB processing is arranged so as to correspond to a pixel position. Similarly, the G plane is an image in which the G signal of the Bayer image not subjected to WB processing is arranged and the B plane is an image in which the B signal of the Bayer image not subjected to WB processing is arranged. These R plane, G plane, and B plane subjected to the color separation are obtained by replacing color signals of pixels other than pixels of a target color in the Bayer image with 0, and detailed description thereof will be given in in FIGS. 4A to 4D described later. The signal of the G plane, the signal of the R plane, and the signal of the B plane that are subjected to the color separation are respectively transmitted to a filter circuit for G 206, a filter circuit for R 207, and a filter circuit for B 208.

The WB processing circuit 202 performs three kinds of WB processing of first WB processing, second WB processing, and third WB processing described later for the input image 200 and generates signals 203, 204, and 205 of the image subjected to the respective kinds of white balance processing. As described later, the signals 203, 204, and 205 subjected to the processing of the first WB processing, the second WB processing, and the third WB processing are referred to in processing performed in the filter circuit for G 206, the filter circuit for R 207, and the filter circuit for B 208. The signal 203 subjected to the first WB processing by the WB processing circuit 202 is transmitted to the filter circuit for G 206, the signal 204 subjected to the second WB processing is transmitted to the filter circuit for R 207, and the signal 205 subjected to the third WB processing is transmitted to the filter circuit for B 208.

The filter circuit for G 206, the filter circuit for R 207, and the filter circuit for B 208 are filtering processing units that perform filtering processing including synchronized interpolation processing and band limitation for G, R, and B, respectively. In the synchronized interpolation processing of the filter circuit for G 206 to the filter circuit for B 208, the R plane, the G plane, and the B plane subjected to the color separation are subjected to processing in which the respective color signals are interpolated and arranged so as to correspond to the respective pixel positions of the Bayer image that is the input image 200. Though details will be described later, in the present embodiment, by referring to the signals of the respective planes subjected to the color separation and the signals 203 to 205 subjected to the WB processing, adaptive filtering processing in consideration of a sampling structure of the Bayer array is performed, so that images of color signals whose color ratio is equivalent to that of the input image 200 are generated. That is, in the filter circuit for G 206, the filter circuit for R 207, and the filter circuit for B 208, the interpolated images of the G plane, the R plane, and the B plane that have the color ratio equivalent to RGB of the input image 200 not subjected to WB processing are generated. In the following description, the interpolated G plane, the interpolated R plane, and the interpolated B plane that have the color ratio equivalent to RGB of the input image 200 not subjected to WB processing are respectively referred to as an adaptive G plane, an adaptive R plane, and an adaptive B plane. Then, a signal of the adaptive G plane output from the filter circuit for G 206 is transmitted to a resizing circuit 210, a signal of the adaptive R plane output from the filter circuit for R 207 is transmitted to a resizing circuit 211, and a signal of the adaptive B plane output from the filter circuit for B 208 is transmitted to a resizing circuit 212.

The resizing circuits 210, 211, and 212 respectively perform resizing processing of resizing the adaptive G plane, the adaptive R plane, and the adaptive B plane, which are input, with a predetermined ratio, that is, in the present embodiment, reducing processing of reducing the adaptive G plane, the adaptive R plane, and the adaptive B plane with a predetermined reduction ratio. Though details will be described later, the resizing circuit 210 performs the resizing processing for the adaptive G plane and generates a resized image (hereinafter, referred to as a reduced G plane) of the G plane not subjected to WB processing. Similarly, the resizing circuit 211 performs the resizing processing for the adaptive R plane and generates a resized image (hereinafter, referred to as a reduced R plane) of the R plane not subjected to WB processing. Moreover, the resizing circuit 212 performs the resizing processing for the adaptive B plane and generates a resized image (hereinafter, referred to as a reduced B plane) of the B plane not subjected to WB processing. Then, the reduced G plane, the reduced R plane, and the reduced B plane respectively generated by the resizing circuits 210, 211, and 212 are transmitted to an output circuit 213.

The output circuit 213 integrates the reduced G plane, the reduced R plane, and the reduced B plane as described later to thereby generate and output a reduced raw image 214.

Description will be given below for processing of generating planes whose color ratio is equivalent to that of an image (input image 200) not subjected to WB processing on the basis of the signals of the R, G, and B planes subjected to the color separation by the color separation circuit 201 and not subjected to WB processing and the signals 203 to 205 subjected to the WB processing by the WB processing circuit 202. As described above, by referring to the signals 203 to 205 subjected to the WB processing and the signals of the R, G, and B planes not subjected to WB processing, the filter circuit for G 206 to the filter circuit for B 208 perform adaptive filtering processing in consideration of a sampling structure of the Bayer array.

The adaptive filtering processing is processing in which, when a pixel correlation in a horizontal direction is high, the target pixel is interpolated by referring to pixels that have the same color and are adjacent to the target pixel in a left-right direction, and when a pixel correlation in a vertical direction is high, the target pixel is interpolated by referring to pixels that have the same color and are adjacent to the target pixel in an up-down direction. With such processing, high-quality R. G, and B planes in which aliasing distortion and lowering of perceived resolution due to interpolation are suppressed are able to be obtained, so that images that are resized (reduced) by the subsequent resizing processing are also able to have suitable image quality.

However, since a Bayer-array image has pixels of the respective color filters of R, G, and B regularly adjacent in a mosaic pattern, when a correlation of pixels proximate to the target pixel is determined, a difference from a color signal different from that of the target pixel needs to be taken first. At this time, before taking a difference between different color signals, a signal level difference caused by spectral characteristics of the color filters needs to be separated from a color signal of a subject by white balance adjustment (WB adjustment). On the other hand, the image resizing circuit 105 needs to perform demosaic processing (synchronized interpolation processing) and reducing processing by using RGB signals not subjected to WB processing so as to enable the user to perform desired color adjustment.

Accordingly, in the present embodiment, processing is performed in such a manner that a color signal to be subjected to WB adjustment is changed for each of color signals to be subjected to filtering, and WB processing is applied to a reference signal of the filtering processing and a result of the filtering processing is not subjected to WB processing. That is, in the present embodiment, by performing adaptive filtering processing in consideration of a sampling structure of the Bayer array on the basis of signals subjected to the WB processing and signals of planes not subjected to WB processing, planes whose color ratio is equivalent to that of an image not subjected to WB processing are generated. Detailed description will be further given below.

Description will be given for details of WB processing performed in the WB processing circuit 202.

First, the WB processing circuit 202 extracts, from the input image 200, a white region that is referred to for calculating a white balance gain (hereinafter, referred to as a WB gain). Further, the WB processing circuit 202 calculates values Rw, Gw, and Bw that are obtained by integrating pixel values of the colors of R, G, and B included in the white region for respective colors. Processing of extracting the white region is such that, for example, by referring to a luminance signal of the input image 200, a pixel in which the luminance signal has a predetermined level or more is selected. Then, the WB processing circuit 202 performs three kinds (three patters) of WB processing of the first WB processing, the second WB processing, and the third WB processing on the basis of the integrated values Rw, Gw, and Bw of the white region.

The first WB processing performed in the WB processing circuit 202 is gain adjustment processing in which the G signal of the input image 200 is used as a reference and signal levels of the R signal and the B signal other than the reference are adjusted. A result of the first WB processing is used in the filter circuit for G 206 in a subsequent stage.

Here, it is assumed that the R, G, and B signals of the input image 200 to the WB processing circuit 202 are respectively signals Rin, Gin, and Bin, WB gains for R, G, and B used in the first WB processing are respectively gains WGr1, WGg1, and WGb1, and the R, G, and B signals subjected to the first WB processing are respectively signals R1, G1, and B1. In a case of the present embodiment, the signals R1, G1, and B1 subjected to the first WB processing are represented by a formula (1). Note that, WGr1 and WGb1 in the formula (1) are WB gains calculated by a formula (2) with use of the integrated values Rw, Gw, and Bw of R, G, and B in the white region. In a case of the first WB processing, the G signal is the reference color signal and is thus not applied with a WB gain, and the input G signal is directly output as the signal Gin. That is, as WB gains in the case of the first WB processing, only the WB gain for R WGr1 and the WB gain for B WGb1 that are calculated by the formula (2) are used. Thus, the signal level of the G signal does not change before and after the first WB processing, so that the G signal is not clipped by the first WB processing.

$R1=Rin*WGr1$ $G1=Gin$ $B1=Bin*WGb1$ formula (1)

$WGr1=Gw/Rw$ $WGb1=Gw/Bw$ formula (2)

The second WB processing performed in the WB processing circuit 202 is gain adjustment processing in which the R signal of the input image 200 is used as a reference and signal levels of the G signal and the B signal other than the reference are adjusted. A result of the second WB processing is used in the filter circuit for R 207 in a subsequent stage.

Here, similarly to the foregoing description, it is assumed that the R, G, and B signals of the input image 200 are respectively signals Rin, Gin, and Bin, WB gains in the second WB processing are gains WGr2, WGg2, and WGb2, and the R, G, and B signals subjected to the second WB processing are respectively signals R2, G2, and B2. In a case of the present embodiment, the signals R2, G2, and B2 subjected to the second WB processing are represented by a formula (3), and WGg2 and WGb2 in the formula (3) are WB gains calculated by a formula (4) with use of the integrated values Rw, Gw, and Bw of R, G, and B in the white region. In a case of the second WB processing, the R signal is the reference color signal and is thus not applied with a WB gain, and the input R signal is directly output as the signal Rin. That is, as WB gains in the case of the second WB processing, only the WB gain for G WGg2 and the WB gain for B WGb2 that are calculated by the formula (4) are used. Thus, the signal level of the R signal does not change before and after the second WB processing, so that the R signal is not clipped by the second WB processing.

$R2=Rin$ $G2=Gin*WGg2$ $B2=Bin*WGb2$ formula (3)

$WGg2=Rw/Gw$ $WGb2=Rw/Bw$ formula (4)

The third WB processing performed in the WB processing circuit 202 is gain adjustment processing in which the B signal of the input image 200 is used as a reference and signal levels of the R signal and the G signal other than the reference are adjusted. A result of the third WB processing is used in the filter circuit for B 208 in a subsequent stage.

Similarly to the foregoing description, it is assumed that the R, G, and B signals of the input image 200 are respectively signals Rin, Gin, and Bin, WB gains in the third WB processing are gains WGr3, WGg3, and WGb3, and the R, G, and B signals subjected to the third WB processing are respectively signals R3, G3, and B3. In a case of the present embodiment, the signals R3, G3, and B3 subjected to the third WB processing are represented by a formula (5), and WGr3 and WGg3 in the formula (5) are WB gains calculated by a formula (6) with use of integrated values Rw, Gw, and Bw of R, G, and B in the white region. In a case of the third WB processing, the B signal is the reference color signal and is thus not applied with a WB gain, and the input B signal is directly output as the signal Bin. That is, as WB gains in the case of the third WB processing, only the WB gain for R WGr3 and the WB gain for G WGg3 that are calculated by the formula (6) are used. Thus, the signal level of the B signal does not change before and after the third WB processing, so that the B signal is not clipped by the third WB processing.

$R3=Rin*WGr3$ $G3=Gin*WGg3$ formula (5)

$B3=Bin$ $WGr3=Bw/Rw$ $WGg3=Bw/Gw$ formula (6)

FIG. 3 is a flowchart illustrating a flow of processing performed in the image resizing circuit 105. Description will be given below with reference to the flowchart of FIG. 3. Note that, the processing in the flowchart may be realized by a CPU or the like performing a program stored in a non-volatile memory or the like, or may be realized only by a hardware configuration or realized such that a part of the processing is performed by a hardware configuration and the other processing is performed by a software configuration. In the following description, step S301 to step S327 in the flowchart of FIG. 3 are respectively abbreviated as S301 to S327.

First, at S301, the color separation circuit 201 separates the Bayer image that is the input image 200 into planes of respective colors of R, G, and B. Here, FIG. 4A illustrates an example of Bayer array in which pixels of R, G, and B are regularly arranged so as to correspond to color filters of the image capturing element 102. FIG. 4B illustrates array of pixels of the G plane subjected to the color separation by the color separation circuit 201, and similarly, FIG. 4C illustrates array of pixels of the R plane subjected to the color separation and FIG. 4D illustrates array of pixels of the B plane subjected to the color separation. These R plane, G plane, and B plane are obtained by replacing color signals of pixels other than pixels of a target color in the Beyer image illustrated in FIG. 4A with 0. In the following description, signals of the R plane, the G plane, and the B plan subjected to the color separation are respectively referred to as an R0 signal, a G0 signal, and B0 signal.

After S301, processing of the image resizing circuit 105 is branched to processing from S302 to S306, processing from S312 to S316, and processing from S322 to S326.

First, the processing from S302 to S306 will be described. In the processing from S302 to S306, a reduced G plane not subjected to WB processing is generated.

After proceeding to S302, the WB processing circuit 202 applies the first WB processing to the input image 200 as described above, and transmits a result (signals R1, G1, and B1 subjected to the first WB processing) of the first WB processing to the filter circuit for G 206. After S302, the processing of the image resizing circuit 105 proceeds to S303.

After proceeding to S303, the filter circuit for G 206 performs a plurality of kinds of filtering processing for each of target pixels of the G0 signal of the G plane subjected to the color separation as illustrated in FIG. 4B. Specifically, the filter circuit for G 206 applies a two-dimensional LPF (low pass filter), by which edge components in the horizontal direction and the vertical direction are smoothed, to the G0 signal of a region of n×n pixels (n is a natural number of 1 or more) including the target pixel and generates a signal G0spf. Further, at the same time, the filter circuit for G 206 applies a one-dimensional LPF, by which a horizontal edge component is smoothed, to the G0 signal of a region of 1×n pixels including the target pixel and generates a signal G0vlpf. Furthermore, at the same time, the filter circuit for G 206 applies the one-dimensional LPF, by which an edge component in the vertical direction is smoothed, to the G0 signal of a region of n×1 pixels including the target pixel and generates a signal G0hlpf. After S303, the processing of the image resizing circuit 105 proceeds to S304.

Figure 5:
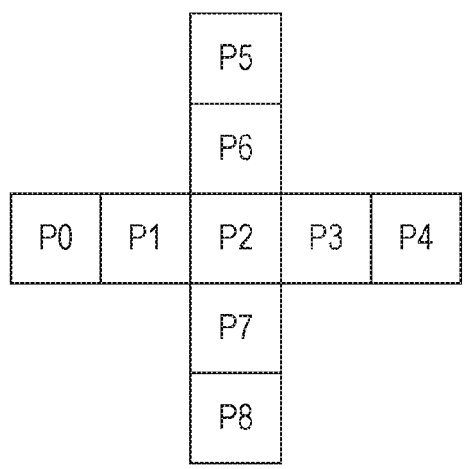
FIG. 5 is a schematic view illustrating a target pixel and pixels proximate to the target pixel, which is referred to in correlation determination processing.

After proceeding to S304, by referring to the signals R1, G1, and B1 subjected to the first WB processing described above, the filter circuit for G 206 generates a correlation determination signal Tg as a control signal for interpolation of G. For example, as illustrated in FIG. 5, it is assumed that a pixel P2 is a target pixel, pixels arranged to be adjacent to the target pixel P2 in the vertical direction are P5, P6, P7, and P8, and pixels arranged to be adjacent to the target pixel P2 in the horizontal direction are P0, P1, P3, and P4. In this case, by referring to the pixels P5, P6, P7, and P8 arranged to be adjacent to the target pixel P2 in the vertical direction and the pixels P0, P1, P3, and P4 arranged to be adjacent to the target pixel P2 in the horizontal direction, the filter circuit for G 206 generates the correlation determination signal Tg by calculation of a formula (7). Note that, in a case of the example of FIG. 5, depending on whether a color signal of the target pixel P2 is R, G, or B, each of pixel positions of the pixels P0, P1, P2, P3, P4, P5, P6, P7, and P8 is any of color signals of the signals R1, G1, and B1.

$$HV\text{diff}=(|2*P2-P0-P4|+|P1-P3|-|2*P2-P5-P8|-|P6-P7|)*k$$

When $HV\text{diff}>TH1$, $Tg=1$, when $HV\text{diff}<TH2$, $Tg=-1$, and when $TH1 \geq HV\text{diff} \geq TH2$, $Tg=HV\text{diff}.$    formula (7)

Note that, in the formula (7), TH1 and TH2 are thresholds that are decided in advance. Moreover, k is any adjustment coefficient decided in accordance with luminance amplitude near the target pixel and is set so that Tg has a value from −1 to 1. The formula (7) indicates that the correlation in the horizontal direction is highest when Tg=−1, the correlation in the vertical direction is highest when Tg=1, and the correlation in both of the horizontal direction and the vertical direction is low when Tg=0. After S304, the processing of the image resizing circuit 105 proceeds to S305.

After proceeding to S305, the filter circuit for G 206 combines results of the plurality of kinds of filtering processing for the G0 signal generated at S303 by referring to the correlation determination signal Tg generated at S304 and generates an adaptive G plane Gpln subjected to synchronized interpolation, by calculation of a formula (8).

When $Tg \geq 0$, $Gpln=G0spf*(1-Tg)+G0hlpf*Tg$, and when $Tg<0$, $Gpln=G0spf*(1-|Tg|)+G0vlpf*|Tg|.$    formula (8).

In the formula (8), as the correlation determination signal Tg is close to 0, an application amount of an output signal G0*spf* of the two-dimensional LPF increases. Moreover, as the correlation determination signal Tg is close to −1, an application amount of an output signal G0*hlpf* of the one-dimensional LPF increases. Moreover, as the correlation determination signal Tg is close to −1, an application amount of an output signal G0*vlpf* of the one-dimensional LPF increases.

Here, in a case of the first WB processing, the R, G, and B signals that are referred to for generating the correlation determination signal Tg are applied with a WB gain by which signal levels of the R signal and the B signal are adjusted with the G signal as a reference. Thus, it is possible that a difference in spectral sensitivity between the color filters is cancelled, a magnitude relation between color signals that are adjacent is appropriately compared, and a correlation of pixels proximate to the target pixel is detected. It is also possible that the adaptive G plane Gpln as a result of the filtering of the G signal not applied with a WB gain is generated while appropriately controlling interpolation characteristics in the synchronized interpolation with use of a correlation determination signal between pixels. After S305, the processing of the image resizing circuit 105 proceeds to S306.

After proceeding to S306, the resizing circuit 210 performs bilinear interpolation or the like by referring to the adaptive G plane Gpln subjected to the synchronized interpolation that is created as described above, and performs resizing processing. As a result, the reduced G plane which is not subjected to WB processing and is appropriately subjected to the filtering is generated.

Next, the processing from S312 to S316 will be described. In the processing from S312 to S316, a reduced R plane not subjected to WB processing is generated.

After proceeding to S312, the WB processing circuit 202 applies the second WB processing to the input image 200, and transmits a result (signals R2, G2, and B2 subjected to the second WB processing) of the second WB processing to the filter circuit for R 207. After S312, the processing of the image resizing circuit 105 proceeds to S313.

After proceeding to S313, the filter circuit for R 207 performs filtering processing for each of target pixels of the R0 signal of the R plane subjected to the color separation as illustrated in FIG. 4C. Specifically, the filter circuit for R 207 applies the two-dimensional LPF to the R0 signal of a region of n×n pixels including the target pixel and thereby generates a signal R0*spf*. After S313, the processing of the image resizing circuit 105 proceeds to S314.

After proceeding to S314, by referring to the signals R2, G2, and B2 subjected to the second WB processing, the filter circuit for R 207 generates a control signal for controlling aliasing in the signal R0*spf* of the R plane generated at S313. The control signal includes a reference signal Tr indicating a correlation of pixels proximate to the target pixel and the G signal for adjusting amplitude of the R signal in the target pixel.

Here, by referring to the pixels P5, P6, P7, and P8 arranged to be adjacent to the target pixel P2 in the vertical direction and the pixels P0, P1, P3, and P4 arranged to be adjacent to the target pixel P2 in the horizontal direction as illustrated in FIG. 5, the filter circuit for R 207 generates the reference signal Tr by calculation of a formula (9). Also in this case, depending on whether a color signal of the target pixel P2 is R, G, or B, each of pixel positions of the pixels P0 to P8 is any of color signals of the signals R2, G2, and B2. The formula (9) indicates that the correlation in the vertical direction is high when Tr=0, and the correlation in the horizontal direction is highest when Tr=1.

$H\text{diff}=|2*P2-P0-P4|+|P1-P3|$ $V\text{diff}=|2*P2-P5-P8|-|P6-P7|$

When $H\text{diff}>V\text{diff}$, $Tr=0$, and when $H\text{diff} \leq V\text{diff}$, $Tr=1.$    formula (9)

Moreover, the filter circuit for R 207 generates, from the signal G2 subjected to the second WB processing, the G signal for adjusting the amplitude of the R signal. Specifically, the filter circuit for R 207 applies the two-dimensional LPF, by which the edge components in the vertical direction and the horizontal direction are smoothed, to the signal G2 of a region of n×n pixels including the target pixel and generates a signal G2*spf*. Further, at the same time, the filter circuit for R 207 generates a signal G2*vlpf* as a result of applying the one-dimensional LPF, by which the horizontal edge component is smoothed, to the signal G2 of a region of 1×n pixels including the target pixel. Furthermore, the filter circuit for R 207 generates a signal G2*hlpf* as a result of applying the one-dimensional LPF, by which the vertical edge component is smoothed, to the signal of a region of n×1 pixels including the target pixel. After S314, the processing of the image resizing circuit 105 proceeds to S315.

After proceeding to S315, by using the reference signal Tr and the G signal for amplitude adjustment that are generated at S314, the filter circuit for R 207 performs calculation of a formula (10) for a result of the filtering of the R signal generated at S313, and generates an adaptive R plane Rpln subjected to the synchronized interpolation.

When $Tr=0$, $Rpln=R0spf+G2spf-G2vlpf$, and when $Tr=1$, $Rpln=R0spf+G2spf-G2hlpf$.   formula (10)

In the formula (10), the G signal is added to an interpolation result of the R signal not applied with a WB gain in order to adjust the amplitude in accordance with the correlation of the pixels proximate to the target pixel. For example, a differential signal between the signal G2*spf* and the signal G2*vlpf*, which is added when the reference signal Tr=0, is a high-frequency component generated from the horizontal edge component of the G signal. Moreover, a differential signal between the signal G2*spf* and the signal G2*hlpf*, which is added when the reference signal Tr=1, is a high-frequency component generated from the vertical edge component of the G signal. The signals G2*spf*, G2*vlpf*, and G2*hlpf* are applied with the second WB processing in advance and are thus able to be directly added to the R signal. Accordingly, by adding a high-frequency component generated from the adjacent G signal in accordance with a value of the reference signal Tr, it is possible to reduce lowering of perceived resolution due to interpolation and to reduce aliasing. After S315, the processing of the image resizing circuit 105 proceeds to S316.

After proceeding to S316, the resizing circuit 211 performs bilinear interpolation or the like by referring to the adaptive R plane Rpln subjected to the synchronized interpolation that is created as described above, and performs resizing processing. As a result, the reduced R plane which is not subjected to WB processing and is appropriately subjected to the filtering is generated.

Next, the processing from S322 to S326 will be described. In the processing from S322 to S326, a reduced B plane not subjected to WB processing is generated.

After proceeding to S322, the WB processing circuit 202 applies the third WB processing to the input image 200, and transmits a result (signals R3, G3, and B3 subjected to the third WB processing) of the third WB processing to the filter circuit for B 208. After S322, the processing of the image resizing circuit 105 proceeds to S323.

After proceeding to S323, the filter circuit for B 208 performs filtering processing for each of target pixels of the B0 signal of the B plane subjected to the color separation as illustrated in FIG. 4D. Specifically, the filter circuit for B 208 applies the two-dimensional LPF to the B0 signal of a region of n×n pixels including the target pixel and thereby generates a signal B0*spf*. After S323, the processing of the image resizing circuit 105 proceeds to S324.

After proceeding to S324, by referring to the signals R3, G3, and B3 subjected to the third WB processing, the filter circuit for B 208 generates a control signal for controlling aliasing in the signal B0*spf* of the B plane generated at S323. The control signal includes a reference signal Tb indicating a correlation of pixels proximate to the target pixel and the G signal for adjusting the amplitude of the R signal in the target pixel.

Here, by referring to the pixels P5, P6, P7, and P8 arranged to be adjacent to the target pixel P2 in the vertical direction and the pixels P0, P1, P3, and P4 arranged to be adjacent to the target pixel P2 in the horizontal direction as illustrated in FIG. 5, the filter circuit for B 208 generates the reference signal Tb by calculation of a formula (11). Also in this case, depending on whether a color signal of the target pixel P2 is R, G, or B, each of pixel positions of the pixels P0 to P8 is any of color signals of the signals R3, G3, and B3. Moreover, the formula (11) indicates that the correlation in the vertical direction is high when Tb=0, and the correlation in the horizontal direction is highest when Tb=1.

$Hdiff=|2*P2-P0-P4|+|P1-P3|$ $Vdiff=|2*P2-P5-P8|-|P6-P7|$

When $Hdiff>Vdiff$, $Tb=0$, and when $Hdiff \le Vdiff$, $Tb=1$.   formula (11)

Moreover, the filter circuit for B 208 generates, from the signal G3 subjected to the third WB processing, the G signal for adjusting the amplitude of the B signal. Specifically, the filter circuit for B 208 applies the two-dimensional LPF, by which the edge components in the vertical direction and the horizontal direction are smoothed, to the signal G3 of a region of n×n pixels including the target pixel and generates a signal G3*spf*. Further, at the same time, the filter circuit for B 208 generates a signal G3*vlpf* as a result of applying the one-dimensional LPF, by which the horizontal edge component is smoothed, to the signal G3 of a region of 1×n pixels including the target pixel. Furthermore, the filter circuit for B 208 generates a signal G3*hlpf* as a result of applying the one-dimensional LPF, by which the vertical edge component is smoothed, to the signal of a region of n×1 pixels including the target pixel. After S324, the processing of the image resizing circuit 105 proceeds to S325.

After proceeding to S325, by using the reference signal Tb and the G signal for amplitude adjustment that are generated at S324, the filter circuit for B 208 performs calculation of a formula (12) for a result of the filtering of the B signal generated at S323, and generates an adaptive B plane Bpln subjected to the synchronized interpolation.

When $Tb=0$, $Bpln=B0spf+G3spf-G3vlpf$, and when $Tb=1$, $Bpln=B0spf+G3spf-G3hlpf$.   formula (12)

In the formula (12), the G signal is added to an interpolation result of the B signal not applied with a WB gain in order to adjust the amplitude in accordance with the correlation of the pixels proximate to the target pixel. For example, a differential signal between the signal G3*spf* and the signal G3*vlpf*, which is added when the reference signal Tb=0, is a high-frequency component generated from the horizontal edge component of the G signal. Moreover, a differential signal between the signal G3$spf$ and the signal G3$hlpf$, which is added when the reference signal Tb=1, is a high-frequency component generated from the vertical edge component of the G signal. The signals G3$spf$, G3$vlpf$, and G3$hlpf$ are applied with the third WB processing in advance and are thus able to be directly added to the B signal. Accordingly, by adding a high-frequency component generated from the adjacent G signal in accordance with a value of the reference signal Tb, it is possible to reduce lowering of perceived resolution due to interpolation and to reduce aliasing. After S325, the processing of the image resizing circuit 105 proceeds to S326.

After proceeding to S326, the resizing circuit 212 performs bilinear interpolation or the like by referring to the adaptive B plane Bpln subjected to the synchronized interpolation that is created as described above, and performs resizing processing. As a result, the reduced B plane which is not subjected to WB processing and is appropriately subjected to the filtering is generated.

After S306, S316, and S326 described above, the processing of the image resizing circuit 105 proceeds to S327.

After proceeding to S327, the output circuit 213 performs thinning processing of image data for the reduced G plane, the reduced R plane, and the reduced B plane respectively generated at S306, S316, and S326 so as to achieve the Bayer array of FIG. 4A. Then, the output circuit 213 integrates the reduced G plane, the reduced R plane, and the reduced B plane subjected to the thinning processing and generates and outputs the reduced raw image 214.

That is, the image resizing circuit 105 outputs the image subjected to the integrating processing to a configuration in a subsequent stage as the reduced raw image 214 not subjected to WB processing.

With a series of processing described above, the image processing apparatus of the present embodiment is able to generate a reduced raw image not subjected to WB processing from an image which is subjected to analog-to-digital conversion and not subjected to WB processing. That is, RGB signals subjected to WB processing are referred to for controlling adaptive filtering processing in consideration of a sampling structure of the image capturing element, and RGB signals not subjected to WB processing are referred to for a signal finally output as a pixel value. Accordingly, the reduced raw image not subjected to WB processing, which allows the user to perform any WB adjustment later, is able to be generated while suppressing, by adaptive filtering processing, deterioration of image quality in interpolation processing associated with reduction. Further, by applying, to respective RGB signals, WB processing with each of the color signals as a reference and by applying WB processing to a color signal to be processed, a signal value is prevented from being clipped, thus making it possible to improve accuracy of adaptive filtering processing. That is, according to the present embodiment, by performing resizing by referring to an undeveloped image having Bayer array, an undeveloped reduced image that allows image quality adjustment such as WB after resizing (reduction) while reducing lowering of perceived resolution and reducing generation of aliasing that are caused by sampling at a time of image capturing is able to be generated.

Though embodiments of the disclosure have been described above, the disclosure is not limited to the embodiments and various modifications and alterations can be made within the scope thereof. A digital camera as an application example of the image processing apparatus of the present embodiment may be any of a digital single-lens reflex camera, a mirrorless single-lens camera, a compact digital camera, and the like. The image processing apparatus of the present embodiment is applicable not only to the digital camera but also to an in-vehicle camera, a security camera, a medical camera, an industrial camera, a personal computer having a camera function, a tablet terminal, a smartphone, a portable game machine, or the like.

The disclosure also includes processing in which a program that realizes one or more functions of the aforementioned embodiments is supplied to a system or an apparatus via a network or a storage medium and one or more processors in a computer of the system or the apparatus reads out and performs the program. Moreover, the disclosure also includes a circuit (for example, an ASIC) that realizes one or more functions of the embodiments.

The aforementioned embodiments are merely examples, and the scope of the disclosure should not be interpreted in a limited manner by the embodiments. That is, the embodiments may be carried out in various forms without departing from technical idea thereof or main feature thereof.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2018-226426, filed Dec. 3, 2018, which is hereby incorporated by reference herein in its entirety.

What is claimed is:
1. An image processing apparatus comprising:
at least one memory device;
at least one processor;

a processing unit configured to perform a plurality of kinds of white balance processing for an input image that is undeveloped and captured by an image capturing element in which pixels of a plurality of colors are arranged in a mosaic pattern under a predetermined rule;

a generation unit configured to perform color interpolation processing by specifying a correlation between a target pixel and proximate pixels using a signal subjected to white balance processing by the processing unit and performing filtering processing on color signals of the input image not subjected to white balance processing so as to generate an image of each of the color signals whose color ratio is equivalent to that of the input image; and a resizing unit configured to resize the image generated by the generation unit, wherein the processing unit, the generation unit, and the resizing unit are realized by the at least one processor performing a program stored in the at least one memory device.

2. The image processing apparatus according to claim 1, wherein the generation unit generates a control signal according to the correlation and controls interpolation characteristics in the color interpolation processing based on the control signal.

3. The image processing apparatus according to claim 2, wherein the input image includes at least three kinds of color signals of a first color signal, a second color signal, and a third color signal, and wherein the processing unit performs:
first processing of using the first color signal before the white balance processing as a first reference and adjusting levels of color signals other than the first reference,
second processing of using the second color signal before the white balance processing as a second reference and adjusting levels of color signals other than the second reference, and
third processing of using the third color signal before the white balance processing as a third reference and adjusting levels of color signals other than the third reference.

4. The image processing apparatus according to claim 3, wherein the generation unit:
generates an image constituted by the first color signal by referring to a signal subjected to the first processing and the first color signal of the input image,
generates an image constituted by the second color signal by referring to a signal subjected to the second processing and the second color signal of the input image, and
generates an image constituted by the third color signal by referring to a signal subjected to the third processing and the third color signal of the input image.

5. The image processing apparatus according to claim 3, wherein the first color signal is a green color signal, the second color signal is a red color signal, and the third color signal is a blue color signal, green, red, and blue being primary colors, and wherein the generation unit:
combines, based on a signal subjected to the first processing, a plurality of green color signals obtained after performing a plurality of kinds of the filtering processing for the green color signal included in the input image and generates an image constituted by a green color signal, generates, from a red color signal obtained after performing the filtering processing for the red color signal included in the input image, an image constituted by a red color signal based on a signal subjected to the second processing, and generates, from a blue color signal obtained after performing the filtering processing for the blue color signal included in the input image, an image constituted by a blue color signal based on a signal subjected to the third processing.

6. The image processing apparatus according to claim 5, wherein the generation unit combines, based on the correlation in the signal subjected to the first processing, the plurality of green color signals obtained after performing the plurality of kinds of the filtering processing.

7. The image processing apparatus according to claim 5, wherein the generation unit:
adjusts amplitude of the red color signal based on a green color signal subjected to the second processing, and
adjusts amplitude of the blue color signal based on a green color signal subjected to the third processing.

8. The image processing apparatus according to claim 5, wherein the generation unit:
adds a green color signal subjected to the second processing to the red color signal in accordance with the correlation in the signal subjected to the second processing, and
adds the green color signal subjected to the second processing to the blue color signal in accordance with the correlation in the signal subjected to the third processing.

9. The image processing apparatus according to claim 3, further comprising:
an integration unit configured to integrate an image constituted by the first color signal and obtained after resizing by the resizing unit, an image constituted by the second color signal and obtained after the resizing, and an image constituted by the third color signal and obtained after the resizing, so as to perform arrangement according to arrangement of the colors under the predetermined rule,
wherein the integration unit is realized by the at least one processor performing a program stored in the at least one memory device.

10. An image processing method comprising:
performing a plurality of kinds of white balance processing for an input image that is undeveloped and captured by an image capturing element in which pixels of a plurality of colors are arranged in a mosaic pattern under a predetermined rule;
performing color interpolation processing by specifying a correlation between a target pixel and proximate pixels using a signal subjected to white balance processing by the processing unit and performing filtering processing on color signals of the input image not subjected to white balance processing so as to generate an image of each of the color signals whose color ratio is equivalent to that of the input image; and
resizing the image generated by the generation.

11. A non-transitory computer-readable storage medium storing computer-executable instructions for causing a computer to perform an image processing method, the image processing method comprising:
performing a plurality of kinds of white balance processing for an input image that is undeveloped and captured by an image capturing element in which pixels of a plurality of colors are arranged in a mosaic pattern under a predetermined rule;

performing color interpolation processing by specifying a correlation between a target pixel and proximate pixels using a signal subjected to white balance processing by the processing unit and performing filtering processing on color signals of the input image not subjected to white balance processing so as to generate an image of each of the color signals whose color ratio is equivalent to that of the input image; and resizing the image generated by the generation.

\* \* \* \* \*